US009430209B2

(12) United States Patent
Neuer et al.

(10) Patent No.: US 9,430,209 B2
(45) Date of Patent: Aug. 30, 2016

(54) PROCESSING FRAMEWORK FOR GENERATING PRE-CONFIGURATION PACKAGES

(75) Inventors: Peter Neuer, Malsch (DE); Matthias Gressler, Wiesloch (DE)

(73) Assignee: SAP SE, Walldorf (DE)

(*) Notice: Subject to any disclaimer, the term of this patent is extended or adjusted under 35 U.S.C. 154(b) by 1017 days.

(21) Appl. No.: 13/328,119

(22) Filed: Dec. 16, 2011

(65) Prior Publication Data

US 2013/0159691 A1    Jun. 20, 2013

(51) Int. Cl.
*G06F 9/44* (2006.01)
*G06F 9/445* (2006.01)

(52) U.S. Cl.
CPC ...................... *G06F 8/61* (2013.01)

(58) Field of Classification Search
None
See application file for complete search history.

(56) References Cited

U.S. PATENT DOCUMENTS

| | | | | |
|---|---|---|---|---|
| 7,107,574 | B1* | 9/2006 | Nedbal | G06F 9/44505 717/120 |
| 7,389,444 | B2* | 6/2008 | Ma | G06Q 10/10 714/26 |
| 2003/0229891 | A1* | 12/2003 | Neuer | G06F 8/61 717/174 |
| 2003/0233385 | A1* | 12/2003 | Srinivasa | G06F 9/466 718/1 |
| 2005/0192979 | A1* | 9/2005 | Keller | G06F 8/61 |
| 2006/0265706 | A1* | 11/2006 | Isaacson | G06F 8/61 717/174 |
| 2008/0022274 | A1* | 1/2008 | Shieh | G06F 8/61 717/174 |
| 2008/0097626 | A1* | 4/2008 | Reed | G05B 19/4184 700/30 |
| 2009/0055340 | A1* | 2/2009 | Lakshminarayanan | G06F 8/61 706/47 |
| 2009/0094596 | A1* | 4/2009 | Kuiper | G06F 11/1433 717/174 |
| 2009/0100404 | A1* | 4/2009 | Chaturvedi | G06F 8/20 717/101 |
| 2010/0299719 | A1* | 11/2010 | Burks | G06F 9/44505 726/3 |
| 2011/0265087 | A1* | 10/2011 | Chen | G06F 11/3006 718/102 |
| 2011/0307884 | A1* | 12/2011 | Wabe | G06F 8/60 717/178 |
| 2011/0321172 | A1* | 12/2011 | Maeda | G06F 21/608 726/27 |

FOREIGN PATENT DOCUMENTS

EP    1 724 682    11/2006

OTHER PUBLICATIONS

European Search Report for EP 12 00 7739, dated Mar. 14, 2013.

\* cited by examiner

*Primary Examiner* — Wei Zhen
*Assistant Examiner* — Hossain Morshed
(74) *Attorney, Agent, or Firm* — Jones Day

(57) ABSTRACT

Reference packages may include a self-contained set of implementation tasks, that when executed at a computing system, provide the computing system with a particular functionality. Implementation tasks in a reference package may be compared to an existing configuration of a computing system to determine which of the implementation tasks have already been executed/installed in the computing system and which have not. Implementation tasks that have not been installed may be selected for inclusion in a final target package. Implementation tasks that have been partially installed or installed differently in the existing computing system from the implementation tasks may have secondary tasks added to them in the final target package. Each secondary task may enable a change to the configuration of the existing system to resolve the configuration inconsistency between the existing configuration in the computing system and the configuration specified in a corresponding implementation task.

20 Claims, 5 Drawing Sheets

PROCESSING FRAMEWORK FOR GENERATING PRE-CONFIGURATION PACKAGES

BACKGROUND

Many organizations use enterprise resource planning systems and other business computing systems to manage business methods and transactions. These systems often have different modules and components directed to different business functions, such as accounting, logistics, marketing, sales, and so on. Over time, many organizations may change, upgrade, replace, reorganize, or add new functionality to these systems, modules, and/or components.

One option for adding, changing, or replacing functionality in these systems would be to replace the existing systems with new systems that include the added, changed, or replaced functionality. During this replacement operation, the organization's customized settings and configuration changes to the existing system would be overwritten with the default set included in the new system. However, many of these business computing systems include thousands and even hundreds of thousands of customizable settings. Overwriting even a fraction of these settings each time a system functionality change is implemented would require the organization to re-invest time and resources to implement the same or similar customizations. Such a result is inefficient and undesirable given the high initial costs and resource requirements to initially implement the customizations.

Another option would be to add any additional functionality independent of that previously included the existing system. In this option, the additional functionality would be added as an additional option to that provided in the existing system without changing any of the functionality, configuration, or customizable settings in the existing system. A system administrator or other user would then manually reconcile the configuration and setting customizations implemented by the organization in the existing system with the additional functionality added to the existing system. This option is also impractical and undesirable given the thousand of configuration settings that may require manual reconciliation.

The inventors perceive a need for an automated framework enabling new or changed computing system functionality to be integrated into existing computing systems while minimizing unnecessary configuration changes to the existing systems.

DETAILED DESCRIPTION

In an embodiment of the invention, computing system functionality may be organized into one or more reference packages for eventual deployment to individual computing systems. Each reference package may include a series of implementation tasks, that when executed in sequence, may install a complete set of programs and applications that provide the specified functionality in a computing system. Each implementation task may include an instruction for configuring the computing system to support the functionality provided for in the reference package.

The implementation tasks in a reference package may be compared to an existing configuration of a computing system in order to determine which of the implementation tasks have already been executed/installed in the computing system and which tasks have not been installed to provide the specified functionality in the computing system. This may be done because different computing systems may be configured differently and have different versions of software, or even similar versions of software that is configured differently.

One or more of the implementation tasks that have not been installed may be selected to be included in a final target package. Implementation tasks that have been partially installed or installed differently in the existing computing system from the implementation tasks may have secondary tasks added to them in the final target package. Each secondary task may enable a change to the configuration of the existing system to resolve the configuration inconsistency between the existing configuration in the computing system and the configuration specified in a corresponding implementation task.

Implementation tasks that have already been fully performed the computing system by another program or method, need not be re-installed in the computing system and need not be included in the target package. Once each of the implementation tasks in the reference package has been compared to the existing configuration of a computing system and the appropriate implementation tasks and secondary tasks have been added to the final target package, the target package may be deployed and then executed at that particular computing system to complete the installation of the functionality of the reference package in the computing system.

Figure 1:
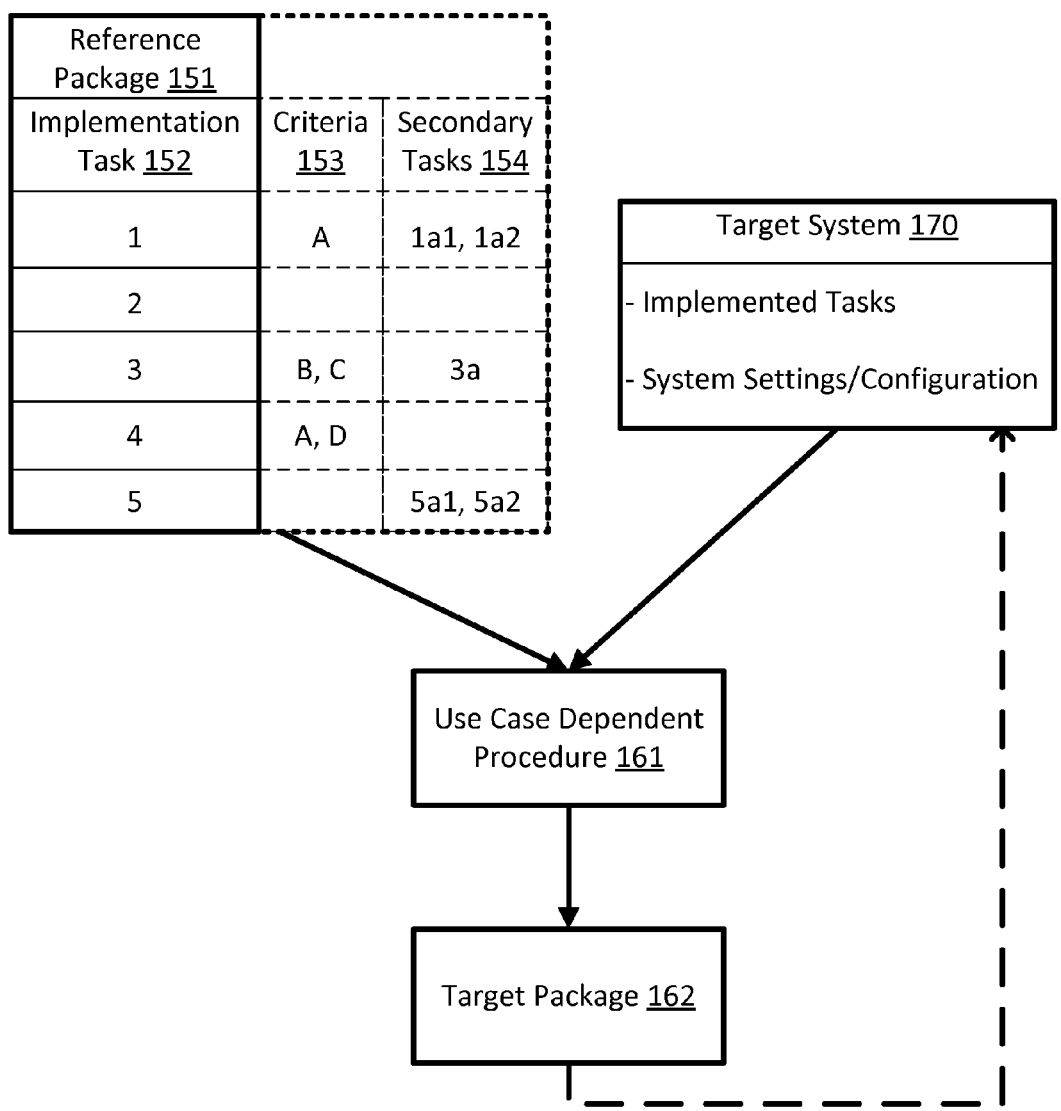
FIG. 1 shows an overview of an embodiment of the invention.

FIG. 1 shows an overview of an embodiment of the invention. In this example, a reference package 151 may include a series of sequential implementation tasks 152 numbered 1 to 5. One or more of the implementation tasks 152 may have additional criteria 153 and/or secondary tasks 154 associated with the respective implementation task 152. In some embodiments, the criteria 153 and secondary tasks 154 may be included as part of the reference package 151. In other embodiments, the criteria 153 and secondary tasks 154 may stored separately from the reference package 151. In these instances, the criteria 153 and secondary tasks 154 and implementation tasks 152 may include unique identifiers to link the criteria 153 and secondary tasks 154 to particular implementation tasks 152.

The criteria 153 may specify a procedural exception or otherwise identify a unique or alternative procedure to be followed that is different from a standard procedure. For example, the criteria 153 may indicate that an implementation task 152 must always be installed when performing an upgrade, even if the existing system configuration indicates that the task has already been completed. Alternatively, the criteria 153 may indicate that the implementation task 152 is never to be installed when performing an upgrade. In yet another example, the criteria 153 may indicate a special circumstance when a particular secondary task 154 is to be implemented.

The secondary tasks 154 may include one or more different types of secondary tasks 154. Each of these types of secondary tasks may specify a different set of procedures to be followed for changing an existing configuration to resolve an inconsistency or conflict between an instruction in the implementation task and an existing configuration of the system on which the package is to be installed.

A use case dependent procedure 161 may be followed in which the implementation tasks 152 and/or criteria 153 may be compared to the existing system settings and configuration in the target system 170. Depending on the results of the comparison and the criteria 153 associated with the implementation task 153, the implementation task 152 and/or a secondary task 154 associated with the implementation task 152 may be included or not included in the target package 162. Once this process has been completed for each of the implementation tasks 152, a final target package 162 may be created.

The final target package 162 may then be executed at the target system 170 to complete the installation of the new functionality.

Figure 2:
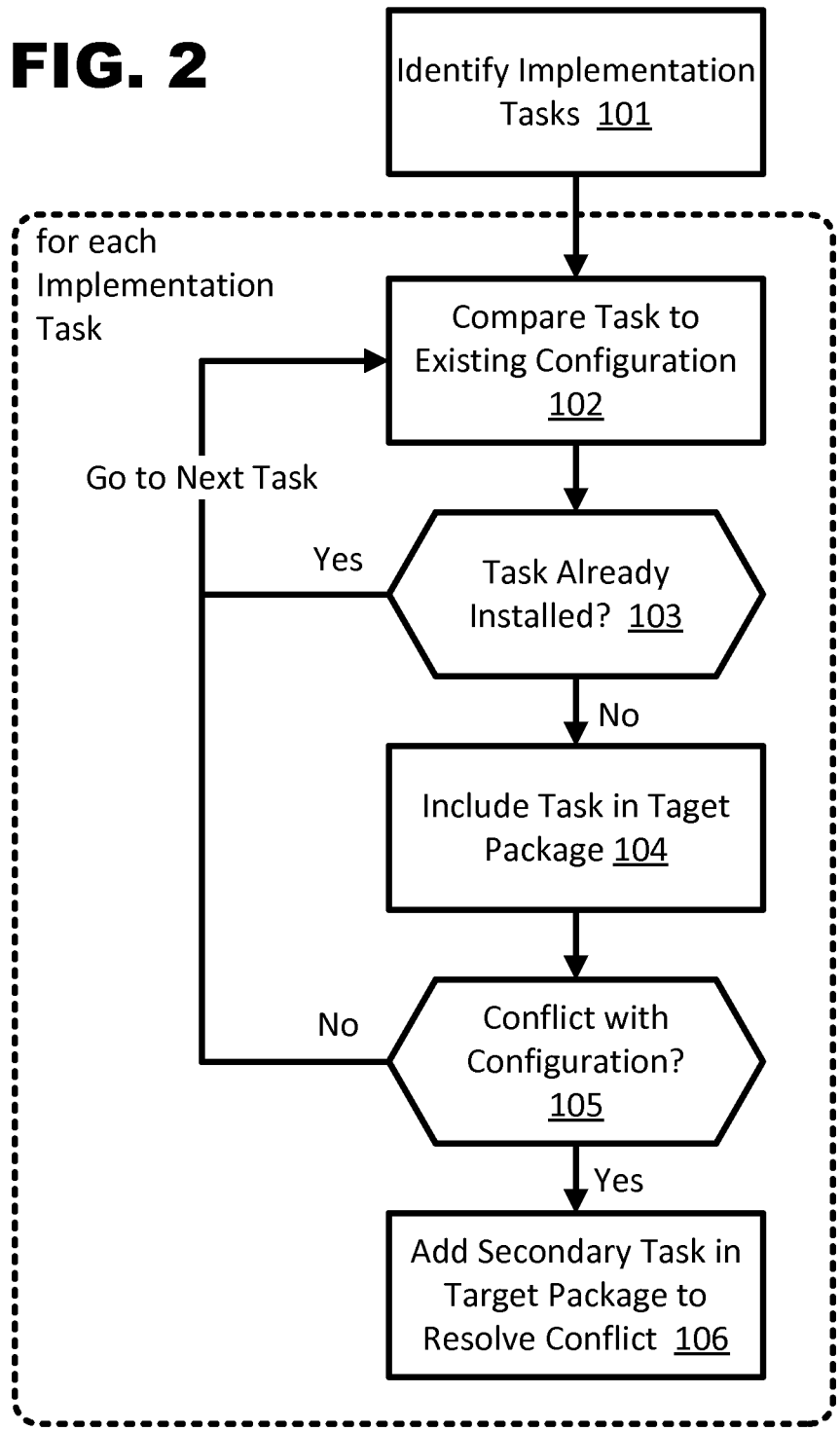
FIG. 2 shows an exemplary process in an embodiment of the invention.

FIG. 2 shows an exemplary process in an embodiment of the invention. In box 101, a series of sequential implementation tasks in a reference package providing a self-contained functionality to a computing system may be identified. These implementation tasks may collectively contain a complete set of instructions for installing, configuring, and enabling a complete set of functionality in a computing system without the need for other modules, applications, programs, or functionality to be separate installed in the computer system for the functionality to be enabled.

In box 102, each of the implementation tasks may be compared sequentially to an existing configuration of the computing system. The sequential comparing may begin with the first implementation task, then proceed to the next implementation task in the sequence, and so on until the last implementation task in the sequence is compared.

In box 103, a processing device may determine whether, based on a result of the comparison, the implementation task being compared to the existing configuration has already been executed, performed, or otherwise installed in the computing system. If the task has already been installed, the next implementation task in the sequence may be selected and the process may go to box 102 to compare the selected next implementation task to the existing configuration of the computing system.

If the task has not been fully installed in the computing system, then in box 104, the implementation task maybe included in a target package contain a set of customized implementation tasks for the computing system. In some instances, implementation tasks may be included in the target package if their installation in the computing system is different from that specified in the implementation task. In some embodiments, these differences may be ignored if the computing system includes additional components, variable, parameters, or features exceeding those specified in the implementation task. For example, if an implementation task creates a object with one parameter, but the object with that parameter and an additional two parameters already exists in the computing system, then the implementation task may be determined to be fully installed in the computing system. In some other embodiments, however, any differences in the computing system from those specified in the implementation task may prevent the implementation from being classified as already installed.

In box 105, a processing device may determine whether, based on a result of the comparison, the implementation task includes one or more configuration/installation instructions conflicting with the existing configuration of the computing system. If the processing device determines that there is no conflict between the implementation task and the existing configuration of the computing system, then the implementation task may be included as is in the target package. The next implementation task in the sequence may then be selected and the process may go to box 102 to compare the selected next implementation task to the existing configuration of the computing system.

If the processing device determines there is a conflict between the implementation task and the existing configuration of the computing system, then a secondary task may added in the target package to the respective implementation task. The secondary task may specify a procedure to be followed for changing the existing configuration to resolve the conflict. In some embodiments, the secondary tasks may be selected from three different types of secondary tasks.

A first type of secondary task may designate a manually specified configuration setting change as the procedure to be followed for changing the existing configuration to resolve the conflict. The manually specified configuration setting change may be supplied by a user through an existing standard configuration dialog. This configuration dialog may be launched prior to adding the secondary task to the target package to provide an opportunity to the user to manually enter a desired configuration setting change. This manually entered type of secondary task may be used in some instances if one the other types described below is incapable of resolving the conflict.

A second type of secondary task may delete a section of the existing configuration conflicting with the respective implementation task and then replace the deleted section with that specified in the respective implementation task. A third type of secondary task may specify a conflict resolving configuration change to the existing configuration that may resolve the conflict. This configuration change information may be obtained from an implementation object or other data source.

As discussed previously, each reference package may contain a complete set of implementation tasks to fully implement a set of functionality in a computing system. In those situations where the computing system has already had previous versions of a reference package installed and a 'latest' reference package is being installed as an upgrade (instead of as a new installation, as may occur in other embodiments), all of the implementation tasks need not be performed in the computing system. In these situations where the reference package is being installed as an upgrade, additional implementation tasks that have been determined by the processing device to not have been already installed may nonetheless be removed from the target package if the implementation task has been designated as not relevant for upgrading. Implementation tasks that, for example, change a font, rearrange an interface, replace a graphic, or perform cosmetic or other non-critical functions may be bypassed in upgrade situations to minimize the risk of user confusion, installation errors, or other complications.

Figure 3:
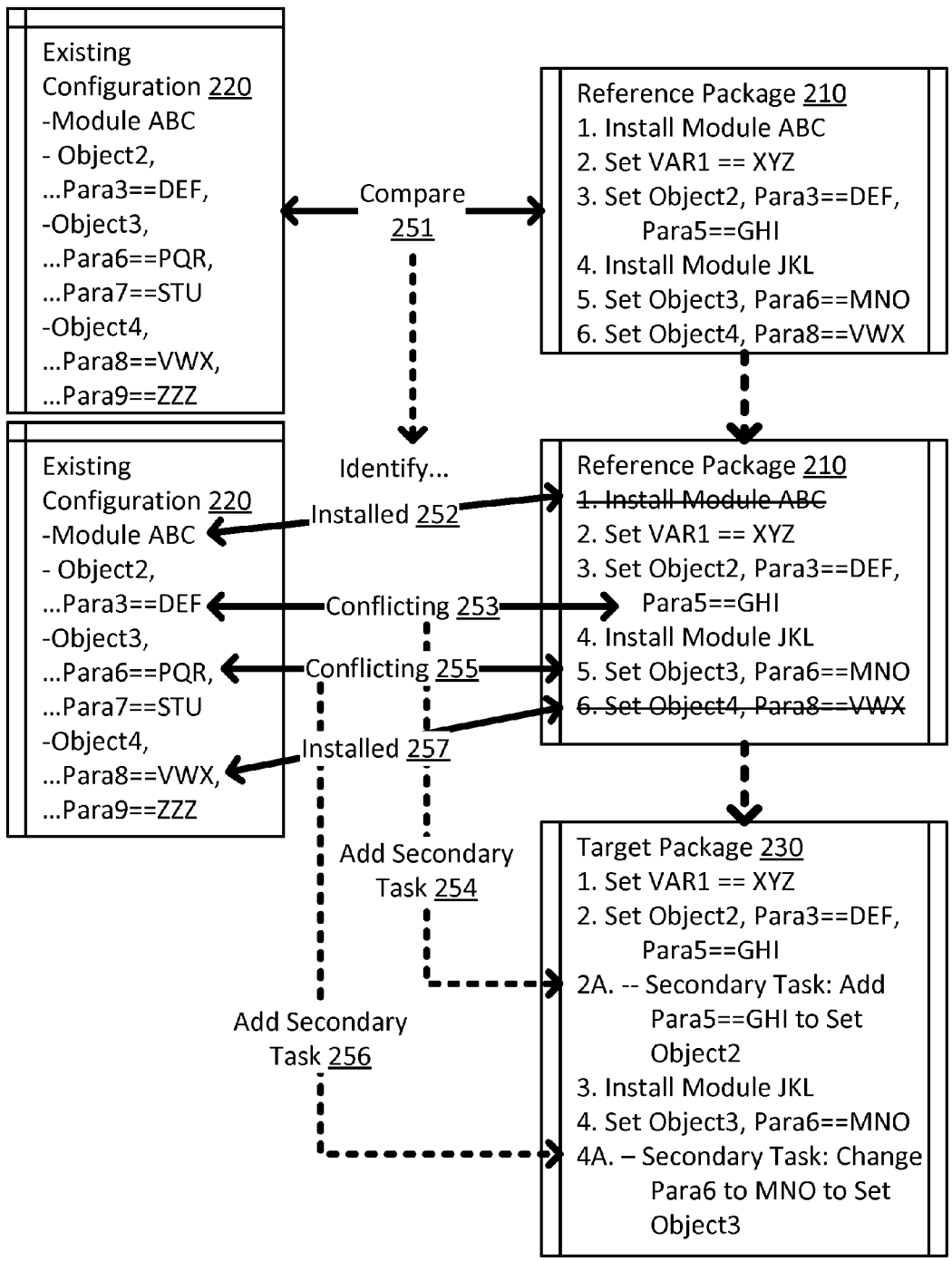
FIG. 3 shows an exemplary creation of a target package in an embodiment of the invention.

FIG. 3 shows an exemplary creation of a target package 230 containing a customized set of implementation tasks from a reference package 210 containing a standard set of implementation tasks. First, the initial implementation task in the reference package 210, Install Module ABC, may be compared 251 to the existing configuration 220 of the computing system. Since Module ABC has already been installed 252 in the computing system, the first implementation task in the reference package 210 need not be included in the target package 230.

Next, the second implementation task, Set VAR1=XYZ may be compared 251 to the existing configuration 220. Since VAR1 is not included in the existing configuration 220, the second implementation task of the reference package 210 may be included as a first implementation task of the target package 230.

Next, the third implementation task, Set Object2 Parameters Para3=DEF and Parar5=GHI, may be compared 251 to the existing configuration 220. Since Object2 in the existing configuration 220 only includes one (Para3=DEF) of two parameters specified in the third implementation task, the third implementation task may be determined to be not installed and conflicting 253 with the existing configuration 220. A secondary task 254 may then be added with the third implementation task of the reference package 210 to the target package 230 to clarify that only the parameter Para5=GHI should be added to Object2 in the existing configuration 220 to complete the third implementation task.

Next, the fourth implementation task in the reference package 210, Install Module JKL, may be compared 251 to the existing configuration 220 of the computing system. Since Module JKL has not already been installed in the computing system, the implementation task may be included in the target package 230 as the third implementation task.

Next, the fifth implementation task, Set Object3 Parameter Para6=MNO, may be compared 251 to the existing configuration 220. Object3 in the existing configuration 220 includes two parameters, including the parameter Para6 mentioned in the fifth implementation task. However, since the parameter Para6 has a different value of PQR in the existing configuration 220, the fifth implementation task may be determined to be not installed and conflicting 255 with the existing configuration 220. A secondary task 256 may then be added with the fifth implementation task of the reference package 210 to the target package 230 to clarify that only the parameter Para6 of Object3 in the existing configuration 220 should be changed to the value MNO to complete the fifth implementation task.

Finally, the sixth implementation task, Set Object4 Parameter Para8=VWX, may be compared 251 to the existing configuration 220. Object4 in the existing configuration 220 includes two parameters, Para8, which is set to VWX, and Para9, which is set to ZZZ. Since Para8 of Object4 is already set to VWX in the existing system, the sixth implementation task may be determined to already be installed 257 in the computing system, and the sixth implementation task in the reference package 210 need not be included in the target package 230.

Figure 4:
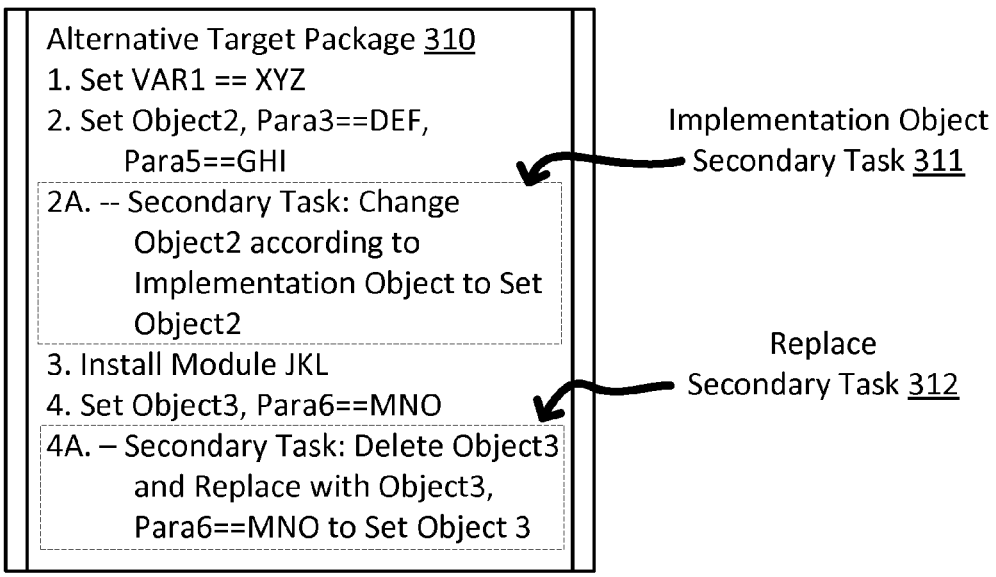
FIG. 4 shows a first alternative target package to that shown in FIG. 2.

FIG. 4 shows a first alternative target package 310 to the target package 230 shown in FIG. 3. The first alternative target package 310 may include different types of secondary tasks 311 and 312 to illustrate how the different types of secondary tasks may be implemented in different embodiments.

In alternative target package 310, an implementation object secondary task 311 may be used instead of the secondary task 2A 'Add Para5=GHI to Set Object2' in target package 230. The implementation object secondary task 311 may specify a conflict resolving configuration change to the existing configuration that may resolve the conflict that may be obtained from an implementation object or other data source. A replace secondary task 312 may also be used instead of the secondary task 4A 'Change Para6 to MNO to Set Object3' in target package 230. The replace secondary task 312, when executed, may delete the configuration settings in the existing configuration 220 associated with Object3 and replace them with the Object3 specified in the respective Implementation Task, including the parameter Para6=MNO, to complete the configuration of Object3 in the computing system.

Figure 5:
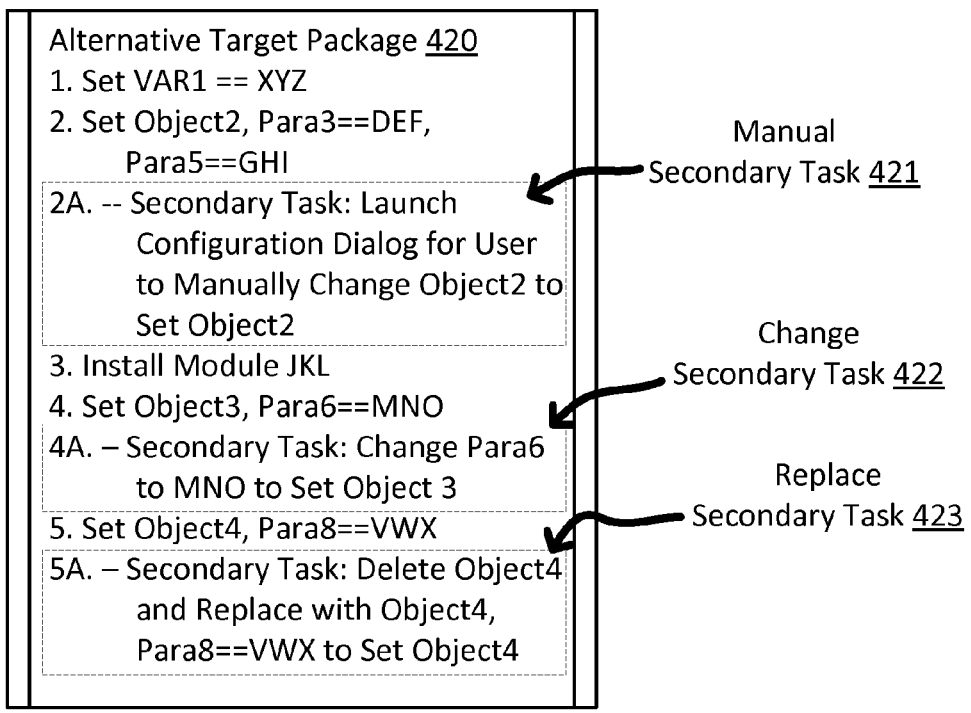
FIG. 5 shows a second alternative target package to that shown in FIG. 2.

FIG. 5 shows a second alternative target packages 420 to the target package 230 shown in FIG. 3. The second alternative target package 420 may include different types of secondary tasks 421, 422, and 423 to illustrate how the different types of secondary tasks may be implemented in different embodiments.

In alternative target package 420, a manual secondary task 421 may be used instead of the secondary task 2A 'Add Para5=GHI to Set Object2' in target package 230. The manual secondary task 421 may, when executed, launch a configuration dialog for the user to manually change the configuration of Object2 in the computing system to complete the configuration of Object2 in the computing system. A change secondary task 422 may also be used instead of the secondary task 4A 'Change Para6 to MNO to Set Object3' in target package 230. The change secondary task 422, when executed, may change the parameter Para6 to MNO to complete the configuration of Object3 in the computing system.

Additionally, in second alternative target package 420, the comparing 251 of implementation tasks in the reference package 210 to the existing configuration 220 may be configured to prevent the implementation tasks from being classified as already installed if there are any differences between an existing configuration 220 of the computing system and a configuration specified in the implementation task. In this situation, the sixth implementation task in the reference package 210 may be determined to be not installed, since Object4 in the existing configuration 220 has an additional parameter Para9=ZZZ that is not specified in the sixth implementation task of the reference package 210. A secondary task 423 may then be added with the sixth implementation task of the reference package 210 to the second alternative target package 420 to delete Object4 from the existing configuration 220 and replace it with Object4 settings specified in the sixth implementation task to complete the configuration of Object4 in the computing system.

Figure 6:
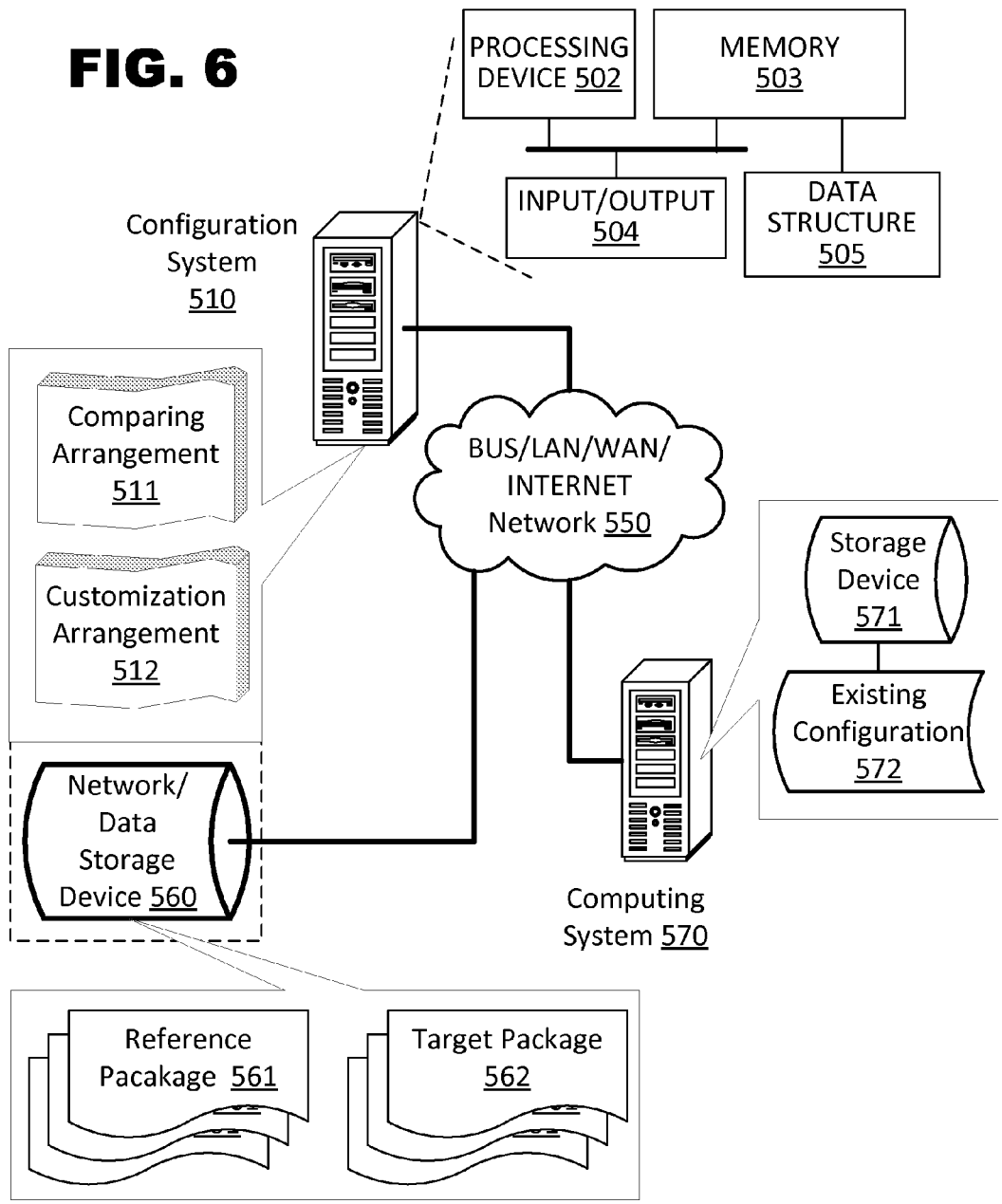
FIG. 6 shows an exemplary architecture in an embodiment of the invention.

FIG. 6 shows an exemplary architecture in an embodiment of the invention. Configuration system 510 may include a comparing arrangement 511 and a target package customization arrangement 512.

The comparing arrangement 511 may include a processing device 502 or other hardware enabling the configuration system 510 to compare implementation task in a reference package 561 to an existing configuration 572 of a computing system 570. The comparing arrangement 511 may be configured to compare each of the implementation tasks in the reference package in sequence to the existing configuration 572 of the computing system 570.

The customization arrangement 512 may include computing hardware, such as a processing device, to create the target package 562. For example, customization arrangement may include in target package 562 each implementation task that is not already installed in the computing system 570 based on a result of the comparing at the comparing arrangement 511. The customization arrangement may also add a secondary task in the target package to each implementation task conflicting with the existing configuration, if a result of the comparing at the comparing arrangement 511 indicates that there is a conflict between the implementation task and the existing configuration 572. The secondary task added to the target package 562 by the customization arrangement 512 may specify a procedure for changing the existing configuration 572 to resolve the conflict.

Configuration system 510 may be connected to a network 550. Network 550 may include a LAN, WAN, bus, or the Internet. Configuration system 510 may interface with other systems and components depending on the application. For example, a network/data storage device 560 may be used to store the different types of data structures, including one or more reference packages 561 and/or target packages 562. The storage device 560 may be a part of the configuration system 510. In some embodiments the network storage device 560 may also be separate from the configuration system 510 but connected to it through network 550. The storage device 560 may contain a hard disk drive, flash memory, or other computer readable media capable of storing data. Other external computing systems 570 and data sources 571 may also be connected to network 550. Configuration data from these other systems 570 may be used to properly configure target packages 562 so that only the necessary components of the reference package 561 are eventually installed on the existing system 570 to provide the additional functionality specified in the reference package 561. In some embodiments, configuration system 510 may be integrated into or otherwise included as part of computing system 570 so that the functionality of both systems is included in a single system.

Each of the systems, clients, and devices in FIG. 5 may contain a processing device 502, memory 503 storing loaded data or a loaded data structure 505, and an communications device 504, all of which may be interconnected via a system bus. In various embodiments, each of the systems 510, 560, and 570 may have an architecture with modular hardware and/or software systems that include additional and/or different systems communicating through one or more networks. The modular design may enable a business to add, exchange, and upgrade systems, including using systems from different vendors in some embodiments. Because of the highly customized nature of these systems, different embodiments may have different types, quantities, and configurations of systems depending on the environment and organizational demands.

Communications device 504 may enable connectivity between the processing devices 502 in each of the systems and the network 550 by encoding data to be sent from the processing device 502 to another system over the network 550 and decoding data received from another system over the network 550 for the processing device 502.

In an embodiment, memory 503 may contain different components for retrieving, presenting, changing, and saving data. Memory 503 may include a variety of memory devices, for example, Dynamic Random Access Memory (DRAM), Static RAM (SRAM), flash memory, cache memory, and other memory devices. Additionally, for example, memory 503 and processing device(s) 502 may be distributed across several different computers that collectively comprise a system.

Processing device 502 may perform computation and control functions of a system and comprises a suitable central processing unit (CPU). Processing device 502 may include a single integrated circuit, such as a microprocessing device, or may include any suitable number of integrated circuit devices and/or circuit boards working in cooperation to accomplish the functions of a processing device. Processing device 502 may execute computer programs, such as object-oriented computer programs, within memory 503.

The foregoing description has been presented for purposes of illustration and description. It is not exhaustive and does not limit embodiments of the invention to the precise forms disclosed. Modifications and variations are possible in light of the above teachings or may be acquired from the practicing embodiments consistent with the invention. For example, some of the described embodiments may include software and hardware, but some systems and methods consistent with the present invention may be implemented in software or hardware alone.

We claim:

1. A computer-implemented method comprising:
    identifying a series of sequential implementation tasks in a reference package providing a self-contained functionality to a computing system, wherein the implementation tasks include instructions that, when executed, set a parameter value of a data object contained in an existing configuration of the computing system;
    comparing, using a processing device, each of the implementation tasks hi sequence to the existing configuration of the computing system, wherein the comparing identifies conflicts between the parameter values in the implementation tasks and parameter values of corresponding data objects in the existing configuration, and wherein the comparing also identifies whether the implementation tasks have been installed:
    including in a target package each implementation task that is not already installed according to the comparing;
    wherein during the comparing each implementation task specifying a configuration that contains an additional parameter value to those of a data object already included in the existing configuration is identified as already installed in the existing configuration and as a result excluding the implementation task from the target package; and
    adding a secondary task in the target package to each implementation task that, according to the comparing, includes a parameter value conflicting with the existing configuration, the secondary task specifying a procedure for changing the existing configuration to resolve the conflict, wherein the procedure sets the parameter values according to the implementation tasks by modifying or replacing conflicting data objects, and wherein the target package is executable at the computing system after all secondary tasks have been added.

2. The computer-implemented method of claim 1, further comprising:
    when executing the secondary task during an execution of the target package at the computing system, launching an existing standard configuration dialog enabling a user to manually specify a change to at least one parameter value in the existing configuration identified as conflicting with the respective implementation task;
    implementing the manually specified change at the computing system; and
    resuming execution of subsequent tasks in the target package.

3. The computer-implemented method of claim 1, wherein the secondary task replaces a section of the existing configuration conflicting with the respective implementation task with that specified in the respective implementation task.

4. The computer-implemented method of claim 1, wherein the secondary task specifies a conflict resolving configuration change to the existing configuration obtained from an implementation object.

5. The computer-implemented method of claim 1, further comprising:
identifying at least one criterion associated with an implementation task, wherein each criterion triggers an alternative procedure that overrides an inclusion or exclusion of a particular implementation task in the target package; and
performing a procedure associated with the identified criterion before including the implementation task in the target package that is not already installed according to the comparing.

6. The computer-implemented method of claim 5, wherein the implementation task is not installed in the target package responsive to the identified criterion indicating that the implementation task is not to be installed.

7. The computer-implemented method of claim 5, further comprising, in an upgrade situation where at least one implementation task is already installed in the existing configuration according to the comparing, removing from the target package each implementation task associated with a criterion designating the implementation task as not relevant for upgrading.

8. The computer-implemented method of claim 1, wherein during the comparing each implementation task specifying a configuration that differs from the existing configuration is identified as conflicting with the existing configuration and as not already installed in the existing configuration.

9. The computer-implemented method of claim 8, wherein during the comparing each implementation task specifying a configuration that contains an additional parameter value to those of a data object already included in the existing configuration is identified as conflicting with the existing configuration.

10. The computer-implemented method of claim 8, wherein during the comparing each implementation task specifying a configuration that contains a different parameter value from that which has already been set for a data object in the existing configuration is identified as conflicting with the existing configuration.

11. The computer-implemented method of claim 1, further comprising including in the target package a component of those implementation tasks containing an additional parameter value.

12. The computer-implemented method of claim 1, wherein during the comparing each implementation task specifying a configuration that contains a parameter value that is different from a corresponding parameter value in the existing configuration is identified as already installed in the existing configuration.

13. The computer-implemented method of claim 12, further comprising including in the target package those implementation tasks containing a parameter value that is different from a corresponding parameter value in the existing configuration.

14. The computer-implemented method of claim 13, further comprising adding a secondary task to each of those implementation tasks containing a parameter value that is different from a corresponding parameter value in the existing configuration, each of the secondary tasks specifying a change to the existing configuration to resolve the difference.

15. The computer-implemented method of claim 1, wherein each secondary task is appended to a respective implementation task in the target package to modify execution of the respective implementation task.

16. A system comprising:
a processing device;
a memory device;
a comparing arrangement to identify a series of sequential implementation tasks in a reference package providing a self-contained functionality and compare, using the processing device, each of the implementation tasks in sequence to an existing configuration of an external computing system, wherein the implementation tasks include instructions that, when executed, set a parameter value of a data object contained in an existing configuration of the computing system, wherein the comparing identifies conflicts between the parameter values in the implementation tasks and parameter values of corresponding data objects in the existing configuration, and wherein the comparing also identifies whether the implementation tasks have been installed;
wherein during the comparing each implementation task specifying a configuration that contains an additional parameter value to those of a data object already included in the existing configuration is identified as already installed in the existing configuration and as a result excluded from the target package; and
a customization arrangement to include in a target package each implementation task that is not already installed according to the comparing at the comparing arrangement and add a secondary task in the target package to each implementation task that, according to the comparing at the comparing arrangement, includes a parameter value conflicting with the existing configuration, the secondary task specifying a procedure for changing the existing configuration to resolve the conflict, wherein the procedure sets the parameter values according to the implementation tasks by modifying or replacing conflicting data objects, and wherein the target package is executable at the computing system after all secondary tasks have been added.

17. The system of claim 16, wherein the customization arrangement is configured with at least three types of secondary tasks from which a selection is made, the three types including:
a first type of secondary task that designates a manually entered change as the specified procedure in the secondary task for changing the existing configuration to resolve the conflict, the manually entered change entered by a user through an existing standard configuration dialog enabling the user to manually change at least one parameter value in the existing configuration identified as conflicting with the respective implementation task,
a second type of secondary task that deletes and replaces a section of the existing configuration conflicting with the respective implementation task with that specified in the respective implementation task, and
a third type of secondary task that specifies a conflict resolving configuration change to the existing configuration, wherein the conflict resolving configuration change modifies the conflicting section without deleting the conflicting section.

18. The system of claim 17, wherein the conflict resolving configuration change to the existing configuration is obtained from an implementation object.

19. A memory device comprising stored instructions that, when executed by a processing device, cause the processing device to:
identify a series of sequential implementation tasks in a reference package providing a self-contained functionality to a computing system, wherein the implementation tasks include instructions that, when executed, set a parameter value of a data object contained in an existing configuration of the computing system;

compare, using a processing device, each of the implementation tasks in sequence to the existing configuration of the computing system, wherein the comparing identifies conflicts between the parameter values in the implementation tasks and parameter values of corresponding data objects in the existing configuration, and wherein the comparing also identifies whether the implementation tasks have been installed;

include in a target package each implementation task that is not already installed according to the comparing;

wherein during the comparing each implementation task specifying a configuration that contains an additional parameter value to those of a data object already included in the existing configuration is identified as already installed in the existing configuration and as a result exclude the implementation task from the target package; and add a secondary task in the target package to each implementation task that, according to the comparing, includes a parameter value conflicting with the existing configuration, the secondary task specifying a procedure for changing the existing configuration to resolve the conflict, wherein the procedure sets the parameter values according to the implementation tasks by modifying or replacing conflicting data objects, and wherein the target package is executable at the computing system after all secondary tasks have been added.

20. The memory device of claim 19, wherein the stored instructions, include at least one criterion for overriding the inclusion of at least one implementation task in the target package and changing at least one secondary task added in the target package.

* * * * *